United States Patent
Sjöberg et al.

(10) Patent No.: US 12,192,495 B2
(45) Date of Patent: Jan. 7, 2025

(54) SCALABILITY USING TEMPORAL SUBLAYERS

(71) Applicant: Telefonaktiebolaget LM Ericsson (publ), Stockholm (SE)

(72) Inventors: Rickard Sjöberg, Stockholm (SE); Jacob Ström, Stockholm (SE); Martin Pettersson, Vallentuna (SE); Mitra Damghanian, Upplands-Bro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 18/013,581

(22) PCT Filed: Jun. 30, 2021

(86) PCT No.: PCT/EP2021/067998
§ 371 (c)(1),
(2) Date: Dec. 29, 2022

(87) PCT Pub. No.: WO2022/003024
PCT Pub. Date: Jan. 6, 2022

(65) Prior Publication Data
US 2023/0247211 A1      Aug. 3, 2023

Related U.S. Application Data

(60) Provisional application No. 63/046,646, filed on Jun. 30, 2020.

(51) Int. Cl.
*H04N 19/31*       (2014.01)
*H04N 19/107*      (2014.01)
(Continued)

(52) U.S. Cl.
CPC .......... *H04N 19/31* (2014.11); *H04N 19/107* (2014.11); *H04N 19/184* (2014.11); *H04N 19/187* (2014.11); *H04N 19/70* (2014.11)

(58) Field of Classification Search
None
See application file for complete search history.

(56) References Cited

U.S. PATENT DOCUMENTS

| | | |
|---|---|---|
| 2015/0103926 A1 | 4/2015 | Hannuksela |
| 2017/0094288 A1* | 3/2017 | Hannuksela ......... H04N 19/187 |

OTHER PUBLICATIONS

M. Pettersson et al., "AHG9: Picture output suppression SEI message", 21st Meeting of Joint Video Experts Team (JVET) of ITU-T SG 16 WP 3 and ISO/IEC JTC 1/SC 29, Jan. 6-15, 2021, No. JVET-U0045-v1, 6 pages. (Year: 2021).*

(Continued)

*Primary Examiner* — Stuart D Bennett
(74) *Attorney, Agent, or Firm* — Sage Patent Group

(57) ABSTRACT

A method and apparatus for decoding and outputting one or more pictures from a bitstream is provided. The method includes obtaining an indication that specifies that the decoder should not output pictures belonging to a temporal layer. The method includes decoding at least one picture from a bitstream wherein picture(s) belong to the temporal layer. The method includes decoding at least one picture from a bitstream wherein picture(s) belong to one temporal layer not equal to. The method includes responsive to receiving the indication, suppressing output of the at least one picture. The method includes outputting the at least one picture.

20 Claims, 8 Drawing Sheets

(51) Int. Cl.
*H04N 19/184* (2014.01)
*H04N 19/187* (2014.01)
*H04N 19/70* (2014.01)

(56) References Cited

OTHER PUBLICATIONS

International Search Report and Written Opinion of the International Searching Authority, PCT/EP2021/067998, mailed Oct. 13, 2021, 15 pages.
M. M. Hannuksela, "MV-HEVC/SHVC HLS: On temporal enhancement layers and diagonal inter-layer prediction", 17th Meeting of JCT-VC and 8th Meeting of JCT on 3D Video Coding Extensions or ITU-T SG 16 WP 3 and ISO/IEC JTC 1/SC 29/WG 11, Mar. 27-Apr. 4, 2014, Nos. JCTVC-Q0105rl/JCT3V-H0035rl, 5 pages.
M. Pettersson et al., "AHG9: Picture output suppression SEI message", 21st Meeting of Joint Video Experts Team (JVET) of ITU-T SG 16 WP 3 and ISO/IEC JTC 1/SC 29, Jan. 6-15, 2021, No. JVET-U0045-v1, 6 pages.

\* cited by examiner

SCALABILITY USING TEMPORAL SUBLAYERS

CROSS REFERENCE TO RELATED APPLICATIONS

This application is a 35 U.S.C. § 371 national stage application of PCT International Application No. PCT/EP2021/067998 filed on Jun. 30, 2021, which in turn claims domestic priority to U.S. Provisional Patent Application No. 63/046,646, filed on Jun. 30, 2020, the disclosures and content of which are incorporated by reference herein in their entirety.

TECHNICAL FIELD

The application relates to methods and apparatuses for video encoding and decoding.

BACKGROUND

HEVC and VVC

High Efficiency Video Coding (HEVC) is a block-based video codec standardized by the ITU-T (Telecommunication Standardization Sector of the International Telecommunications Union) and the MPEG (Moving Pictures Expert Group) that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

The MPEG and the ITU-T are working on the successor to HEVC within the Joint Video Exploratory Team (JVET). The name of this video codec under development is Versatile Video Coding (VVC). The current version of the VVC specification is JVET-S0152-v5.

Components

A video sequence consists of a series of images where each image consists of one or more components. Each component can be described as a two-dimensional rectangular array of sample values. Typically, an image in a video sequence consists of three components: one luma component Y where the sample values are luma values and two chroma components Cb and Cr, where the sample values are chroma values. Typically, the dimensions of the chroma components are smaller than the luma components by a factor of two in each dimension. For example, the size of the luma component of a High Definition (HD) image would be 1920×1080 and the chroma components would each have the dimension of 960×540. Chroma components are sometimes referred to as color components.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC and the current version of VVC begins with a header called the NAL unit header. The syntax for the NAL unit header for HEVC starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as HEVC bitstreams. The NAL unit header in the current version of VVC, shown in Table 1, is very similar to the one in HEVC, but uses 1 bit less for the nal_unit_type and instead reserves this bit for future use. The nal_unit_type, nuh_layer_id and nuh_temporal_id_plus1 code words specify the NAL unit type of the NAL unit that identifies what type of data is carried in the NAL unit, the scalability layer ID and the temporal ID for which the NAL unit belongs to. The NAL unit type indicates and specifies how the NAL unit should be parsed and decoded. The rest of the bytes of the NAL unit is payload of the type indicated by the NAL unit type. A bitstream consists of a series of concatenated NAL units.

The syntax for the NAL unit header for the current VVC draft is shown in Table 1.

TABLE 1

| VVC NAL unit header syntax | |
|---|---|
| | Descriptor |
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The decoding order is the order in which NAL units shall be decoded, which is the same as the order of the NAL units within the bitstream. The decoding order may be different from the output order, which is the order in which decoded pictures are to be output, such as for display, by the decoder.

The NAL unit types of the current version of the VVC draft are shown in Table 2.

TABLE 2

NAL unit types in the current version of the VVC draft

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture* | VCL |
| 8 | IDR_N_LP | slice_layer_rbsp( ) | |
| 9 | CRA_NUT | Coded slice of a CRA picture or subpicture* silce_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set | non-VCL |
| 18 | SUFFIX_APS_NUT | adaptation_parameter_set_rbsp( ) | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information | non-VCL |
| 24 | SUFFIX_SEI_NUT | sei_rbsp( ) | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

Scalability Layers

In HEVC and VVC, the value of the nuh_layer_id syntax element in the NAL unit header specifies the scalability layer ID to which a NAL unit belongs to. This enables associating NAL units and pictures with scalability layers that can be used for scalable coding.

Picture Unit, Access Unit and the Access Unit Delimiter

A picture unit (PU) in the current version of VVC is defined as a set of NAL units for which the VCL NAL units all belong to the same layer, that are associated with each other according to a specified classification rule, that are consecutive in decoding order, and that contain exactly one coded picture. In previous versions of VVC, the PU was called layer access unit. In HEVC, the PU is referred to as an access unit (AU).

In VVC, an access unit is a set of PUs that belong to different layers and contain coded pictures associated with the same time for output from the decoded picture buffer (DPB), i.e. having the same POC value.

An access unit, in the current version of VVC, may start with an access unit delimiter (AUD) NAL unit which indicates the start of the access unit and the type of the slices allowed in the coded picture, i.e. I, I-P or I-P-B and whether the access unit is an IRAP or GDR access unit.

Layers—Dependent and Independent Layers

Layers are defined in VVC as a set of VCL NAL units that all have a particular value of nuh_layer_id and the associated non-VCL NAL units.

A coded layer video sequence (CLVS) in the current version of VVC is defined as a sequence of PUs that consists, in decoding order, of a CLVS start (CLVSS) PU, followed by zero or more PUs that are not CLVSS PUs, including all subsequent PUs up to but not including any subsequent PU that is a CLVSS PU.

The relation between the PU, AU, and CLVS is illustrated in FIG. 1.

In the current version of VVC, scalability layers may be coded independently from each other. When the scalability layers are coded independently, a scalability layer with e.g.

nuh_layer_id 0 may not predict video data from another scalability layer with e.g. nuh_layer_id 1. In the current version of VVC, dependent coding between scalability layers may be used, which enables support for scalable coding with SNR, spatial and view scalability.

Temporal Layers

In HEVC and in the VVC draft, all pictures are associated with a TemporalId value which specifies what temporal layer the picture belongs to. TemporalId values are decoded from the nuh_temporal_id_plus1 syntax element in the NAL unit header. The encoder is required to set TemporalId values such that pictures belonging to a lower temporal layer is perfectly decodable when higher temporal layers are discarded. Assume for instance that an encoder has output a bitstream using temporal layers 0, 1 and 2. Then removing all temporal layer 2 NAL units or removing all layer 1 and 2 NAL units will result in bitstreams that can be decoded without problems. This is ensured by restrictions in the HEVC specification that the encoder must comply with. For instance, it is not allowed for a picture of a temporal layer to reference a picture of a higher temporal layer.

Intra Random Access Point (IRAP) Pictures and the Coded Video Sequence (CVS)

For single scalability layer coding in HEVC, an access unit (AU) is the coded representation of a single picture. An AU may consist of several video coding layer (VCL) NAL units as well as non-VCL NAL units.

An intra random access point (IRAP) picture in HEVC is a picture that does not refer to any picture other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture, and the clean random access (CRA) picture.

A coded video sequence (CVS) in HEVC is a sequence of access units starting at an IRAP access unit followed by zero or more AUs up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is a sequence of access units starting at a CVS start (CVSS) access unit followed by zero or more AUs up to, but not including the next CVSS access unit in decoding order. A CVSS access unit may contain an IRAP picture, i.e., an IDR or a CRA picture, or a gradual decoding refresh (GDR) picture. A CVS may contain one or more CLVSs.

GDR pictures are essentially used for random access in bitstreams encoded for low-delay coding where a full IRAP picture would cause too much delay. A GDR picture may use gradual intra refresh that updates the video picture by picture where each picture is only partially intra coded. A recovery POC count is signaled with the GDR picture that specifies when the video is fully refreshed and ready for output, given that the bitstream was tuned in at the GDR picture. A GDR picture in VVC may start a CVS or CLVS. GDR pictures are included in the current VVC draft but are not a normative part of the HEVC standard, where it instead may be indicated with an SEI message.

Parameter Sets

HEVC and VVC specifies three types of parameter sets, the picture parameter set (PPS), the sequence parameter set (SPS), and the video parameter set (VPS). The PPS contains data that is common for a whole picture, the SPS contains data that is common for a coded video sequence (CVS), and the VPS contains data that is common for multiple CVSs, e.g. data for multiple layers in the bitstream.

The current version of VVC also specifies one additional parameter set, the adaptation parameter set (APS). The APS carries parameters needed for an adaptive loop filter (ALF) tool, a luma mapping and chroma scaling (LMCS) tool and a scaling list tool. The APS may contain information that can be used for multiple slices and two slices of the same picture can use different APSes.

Both HEVC and VVC allows certain information (e.g. parameter sets) to be provided by external means. By "external means" should be interpreted as the information is not provided in the coded video bitstream but by some other means not specified in the video codec specification, e.g. via metadata possibly provided in a different data channel or as a constant in the decoder.

Decoding Capability Information (DCI)

DCI specifies information that may not change during the decoding session and that may be useful for the decoder to know about, e.g. the maximum number of allowed sublayers. The information in DCI is not necessary for operation of the decoding process. In previous drafts of the VVC specification the DCI was called decoding parameter set (DPS).

The decoding capability information also contains a set of general constraints for the bitstream, that gives the decoder information of what to expect from the bitstream, in terms of coding tools, types of NAL units, etc. In the current version of VVC, the general constraint information could also be signaled in VPS or SPS.

Picture Order Count (POC)

Pictures in HEVC are identified by their picture order count (POC) values, also known as full POC values. Both encoder and decoder keep track of POC and assign POC values to each picture that is encoded/decoded. Decoded pictures are output in increasing POC order which means that the POC values represents the output order. The picture order count value of a picture is called PicOrderCntVal in HEVC. Usually, PicOrderCntVal for the current picture is simply called PicOrderCntVal.

Picture Output

Reference Picture Resampling (RPR)

RPR is a new feature in VVC that does not exist in HEVC. In HEVC, all pictures of a layer have the same spatial resolution. In VVC however, pictures belonging to the same layer could have different spatial resolution. The spatial resolution (width and height) of a picture is signaled in the PPS in VVC. When the current picture and a reference picture have different spatial resolutions, RPR enables the reference picture to be used for prediction of the current picture by scaling the reference picture to the same spatial resolution as the current picture before prediction. RPR may be used for pictures belonging to the same layer or different layers.

SEI Messages

Supplementary Enhancement Information (SEI) messages are codepoints in the coded bitstream that do not influence the decoding process of coded pictures from VCL NAL units. SEI messages usually address issues of representation/rendering of the decoded bitstream. The overall concept of SEI messages and many of the messages themselves have been inherited from the H.264 and HEVC specifications into VVC specification. In the current version of VVC, an SEI RBSP contains one or more SEI messages.

SEI message syntax table describing the general structure of an SEI message in the current VVC draft is shown in Table 3.

TABLE 3

SEI message syntax table in the current VVC draft

| | Descriptor |
|---|---|
| sei_message( ) { | |
|   payloadType = 0 | |
|   do { | |
|     payload_type_byte | u(8) |
|     payloadType += payload_type_byte | |
|   } while( payload_type_byte = = 0xFF ) | |
|   payloadSize = 0 | |
|   do { | |
|     payload_size_byte | u(8) |
|     payloadSize += payload_size_byte | |
|   } while( payload_size_byte = = 0xFF ) | |
|   sei_payload( payloadType, payloadSize ) | |
| } | |

Annex D in JVET-R2001-v10, the current version of the VVC draft specification, specifies syntax and semantics for SEI message payloads for some SEI messages, and specifies the use of the SEI messages and VUI parameters for which the syntax and semantics are specified in ITU-T H.SEI|ISO/IEC 23002-7.

SEI messages assist in processes related to decoding, display or other purposes. However, SEI messages are not required for constructing the luma or chroma samples by the decoding process. Some SEI messages are required for checking bitstream conformance and for output timing decoder conformance. Other SEI messages are not required for checking bitstream conformance. A decoder is not required to support all SEI messages. Usually, if a decoder encounters an unsupported SEI message, it is discarded.

ITU-T H.SEI|ISO/IEC 23002-7 specifies the syntax and semantics of SEI messages and is particularly intended for use with coded video bitstreams, although it is drafted in a manner intended to be sufficiently generic that it may also be used with other types of coded video bitstreams. JVET-R2007-v2 is the current draft that specifies the syntax and semantics of VUI parameters and SEI messages for use with coded video bitstreams.

The persistence of an SEI message indicates the pictures to which the values signalled in the instance of the SEI message may apply. The part of the bitstream that the values of the SEI message may apply to are referred to as the persistence scope of the SEI message.

SUMMARY

In VVC, it has been discussed to have one profile that supports all VVC tools except scalability layers. This means that e.g. spatial scalability use-cases would not be supported by this profile.

According to some embodiments of inventive concepts, a method for decoding and outputting one or more pictures from a bitstream is provided. The method includes obtaining an indication I1 that specifies that the decoder should not output pictures belonging to a temporal layer T1. The method includes decoding at least one picture P1 from a bitstream wherein picture(s) P1 belong to the temporal layer T1. The method includes decoding at least one picture P2 from a bitstream wherein picture(s) P2 belong to one temporal layer T2 not equal to T1. The method includes responsive to receiving the indication I1, suppressing output of the at least one picture P1. The method includes outputting the at least one picture P2.

Analogous decoder, apparatus, computer program, and computer program product embodiments are provided.

An advantage that may be achieved is that spatial scalability is enabled in a profile that does not support scalability layers (but do support temporal layers and RPR).

According other embodiments of inventive concepts, a method for decoding at least two lower spatial resolution pictures A0 and A1 and two corresponding higher spatial resolution pictures B0 and B1 from a bitstream is provided. The method includes decoding a picture A0 from the bitstream, wherein a temporal ID value equal to A and an output order or timestamp value equal to T0 are decoded from the bitstream for picture A0. The method includes decoding a picture B0 from the bitstream, wherein a temporal ID value equal to B and an output order or timestamp value equal to T1 are decoded from the bitstream for picture B0, wherein B represents a higher temporal layer than A, and wherein T1 represents a later output than T0, and wherein picture B0 uses picture A0 for Inter prediction. The method includes decoding a picture A1 from the bitstream, wherein a temporal ID value equal to A and an output order or timestamp value equal to T2 are decoded from the bitstream for picture A1, wherein T2 represents a later output than T1, and wherein picture A1 uses picture A0 for Inter prediction. The method includes decoding a picture B1 from the bitstream, wherein a temporal ID value equal to B and an output order or timestamp value equal to T3 are decoded from the bitstream for picture B1, wherein T3 represents a later output than T2, and wherein picture B1 uses picture A1 and picture B0 for Inter prediction. The method includes outputting (1309) pictures B0 and B1 but not outputting pictures A0 or A1.

Analogous decoder, apparatus, computer program, and computer program product embodiments are provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 2:
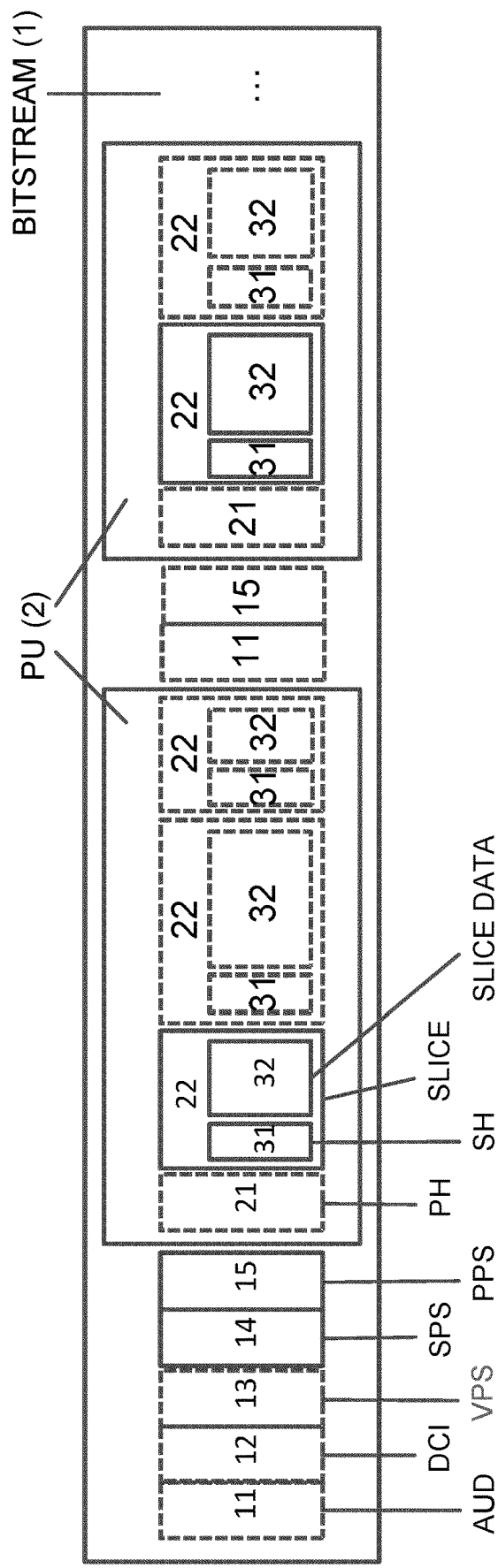
FIG. 2 is a block diagram illustrating a bitstream and terminology used in describing various embodiments of inventive concepts.

In the following description, the term "temporal layer" is used when referring to temporal layers as traditionally used in HEVC. The term "layer" may refer to temporal layers, or scalability layers, or the combination of temporal layers and scalability layers. In this application, layers such as VVC layers are referred to as scalability layers. The term "scalability layer" is used to refer to scalability layers such as SNR, spatial, view scalability that in HEVC and VVC are identified by layer ID values such as nuh_layer_id values. The term "temporal layer" is used to refer to temporal layers as traditionally used in HEVC. The term "layer" in this application may refer to temporal layers, or scalability layers, or the combination of temporal layers and scalability layers The terminology used to describe the inventive concepts is further illustrated in FIG. 2. A dashed line in FIG. 2 indicates that the box is optional in VVC. A bitstream 1 carries one or more coded pictures. The set of NAL units associated with a coded picture is in the current version of VVC and is referred to as a picture unit (PU) 2. A VVC bitstream may start with decoding capability information, (DCI) 12 followed by a video parameter set (VPS) 13, sequence parameter set (SPS) 14, and picture parameter set (PPS) 15 in the beginning of each coded video sequence (CVS). A PPS 14 may also be signaled before any coded picture. A PU 2 must comprise at least one coded slice 22, comprising a slice header (SH) 31 and slice data 32. A PU 2 must include one picture header (PH) 21. In the current version of VVC, the PH 21 may be signaled in its own NAL unit or in the same NAL unit as a slice 22, more specifically in the SH 31. An access unit delimiter (AUD) 11, may be signaled as the first NAL unit in an access unit.

Although the inventive concepts shall mainly be described by terms used in VVC, it is to be understood by a person skilled in the art that the inventive concepts may also be applicable to other current and future video codecs.

Figure 3:
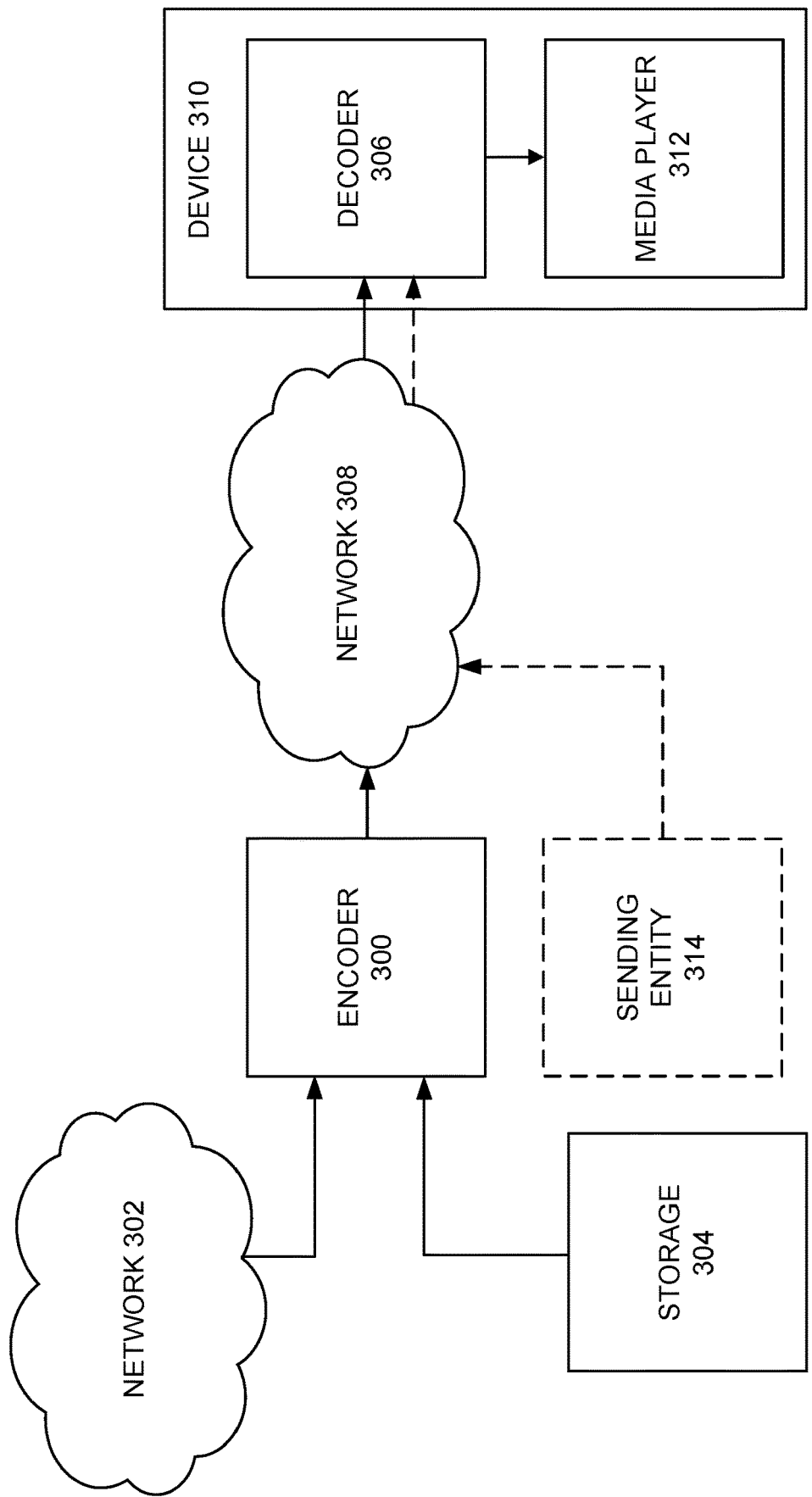
FIG. 3 is a block diagram illustrating an example of an environment of a system in which the encoder and decoder may be implemented according to some embodiments of inventive concepts.

Prior to describing the embodiments in further detail, FIG. 3 illustrates an example of an operating environment of an encoder 300 and decoder 306 that may be used to respectively encode and decode bitstreams as described herein. The encoder 300 receives video from network 302 and/or from storage 304 and encodes the video into bitstreams as described below and transmits the encoded video to decoder 306 via network 308. The encoder 300 in some embodiments also transmits an indicator to specify what pictures to output. The encoder 300 in some embodiments may be part of a sending entity that transmits the indicator. Storage device 304 may be part of a storage depository of multi-channel audio signals such as a storage repository of a store or a streaming video service, a separate storage component, a component of a mobile device, etc. The decoder 306 may be part of a device 310 having a media player 312. The device 310 may be a mobile device, a set-top device, a desktop computer, and the like.

Figure 1:
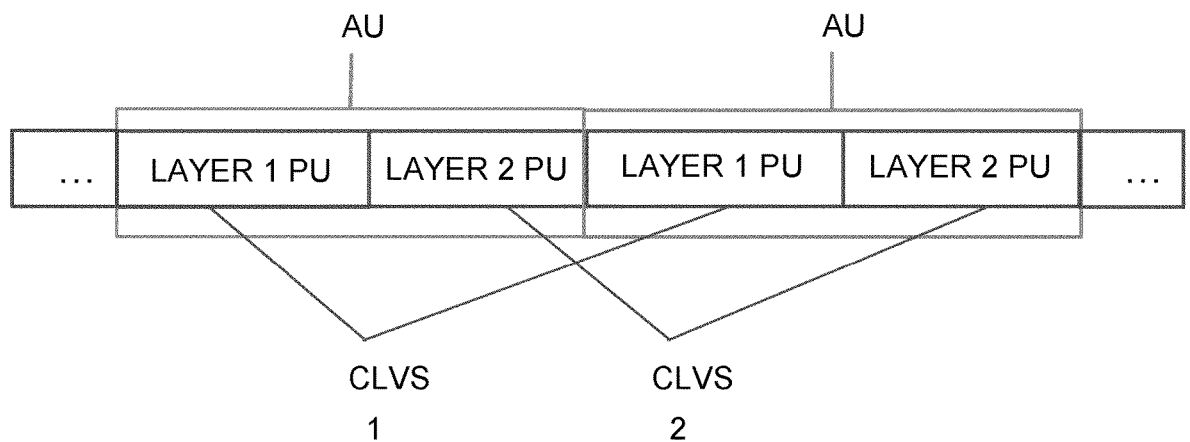
FIG. 1 is a diagram illustrating the relation between picture units (PUs), access units (AUs), and coded layer sequences (CLVSs)
Figure 4:
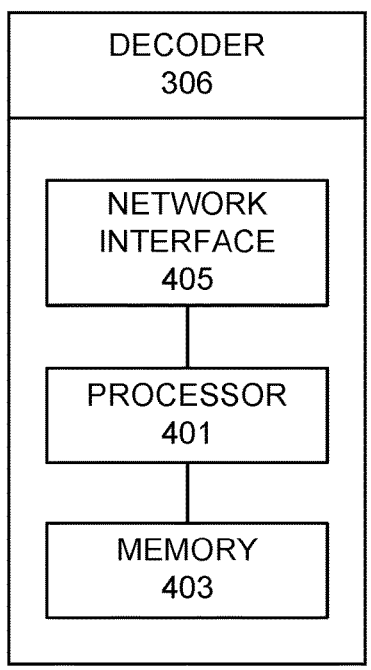
FIG. 4 is a block diagram illustrating a decoder according to some embodiments.

FIG. 4 is a block diagram illustrating elements of decoder 306 configured to decode video frames according to some embodiments of inventive concepts. As shown, decoder 306 may include a network interface circuit 405 (also referred to as a network interface) configured to provide communications with other devices/entities/functions/etc. The decoder 306 may also include a processor circuit 401 (also referred to as a processor) coupled to the network interface circuit 405, and a memory circuit 403 (also referred to as memory) coupled to the processor circuit. The memory circuit 403 may include computer readable program code that when executed by the processor circuit 401 causes the processor circuit to perform operations according to embodiments disclosed herein.

According to other embodiments, processor circuit 401 may be defined to include memory so that a separate memory circuit is not required. As discussed herein, operations of the decoder 306 may be performed by processor 401 and/or network interface 405. For example, processor 401 may control network interface 405 to receive communications from encoder 300. Moreover, modules may be stored in memory 403, and these modules may provide instructions so that when instructions of a module are executed by processor 401, processor 401 performs respective operations and/or causes the decoder 306 or other nodes/functions to perform respective operations. According to some embodiments, a decoder 306 and/or an element(s)/function(s) thereof may be embodied as a virtual node/nodes and/or a virtual machine/machines.

Figure 5:
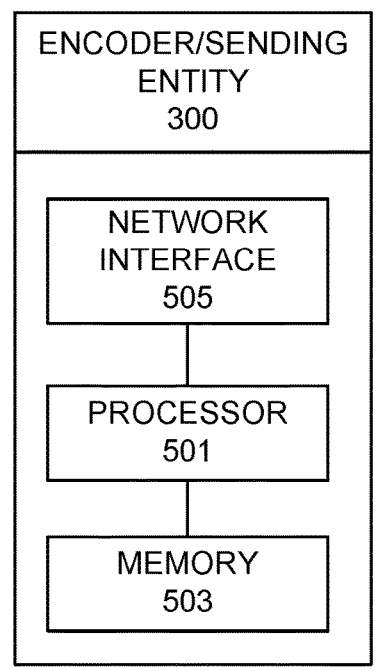
FIG. 5 is a block diagram illustrating an encoder according to some embodiments.

FIG. 5 is a block diagram illustrating elements of encoder 300 configured to encode video frames according to some embodiments of inventive concepts. As shown, encoder 300 may include a network interface circuit 505 (also referred to as a network interface) configured to provide communications with other devices/entities/functions/etc. The encoder 300 may also include a processor circuit 501 (also referred to as a processor) coupled to the network interface circuit 505, and a memory circuit 503 (also referred to as memory) coupled to the processor circuit. The memory circuit 503 may include computer readable program code that when executed by the processor circuit 501 causes the processor circuit to perform operations according to embodiments disclosed herein.

According to other embodiments, processor circuit 501 may be defined to include memory so that a separate memory circuit is not required. As discussed herein, operations of the encoder 300 may be performed by processor 501 and/or network interface 505. For example, processor 501 may control network interface 505 to transmit communications to decoder 306 and/or to receive communications through network interface 505 from one or more other network nodes/entities/servers such as other encoder nodes, depository servers, etc. Moreover, modules may be stored in memory 503, and these modules may provide instructions so that when instructions of a module are executed by processor 501, processor 501 performs respective operations. According to some embodiments, an encoder 300 and/or an element(s)/function(s) thereof may be embodied as a virtual node/nodes and/or a virtual machine/machines.

As previously indicated, it has been discussed in VVC meetings to have one profile that supports all VVC tools except scalability layers. This means that e.g. spatial scalability use-cases would not be supported by this profile.

In various embodiments of inventive concepts, spatial scalability use-cases with the profile described above that does not support scalability layers are supported. This is accomplished in various embodiments by using the reference picture resampling (RPR) feature of VVC in combination with temporal layers. Basically, pictures that would be in different scalability layers are instead put in different temporal layers, all pictures of one temporal layer have the same spatial resolution and Inter prediction across temporal layers is done using RPR.

In a first embodiment of inventive concepts, the output of decoded pictures are controlled based on layer ID values. A layer ID value may here be a temporal layer ID value, a scalability layer ID value, or a particular combination of a temporal layer ID value and a scalability layer ID value.

An encoder 300 or sending entity 312, such as e.g. a network node or a file server, will in this embodiment convey an indicator to a decoder 306 or receiving entity 310. The indication specifies what pictures to output or not output based on layer ID values. The decoder 306 or receiving entity 310 uses this indication when decoding or processing decoded pictures to determine whether or not to discard (i.e. not output) a particular picture.

Figure 6:
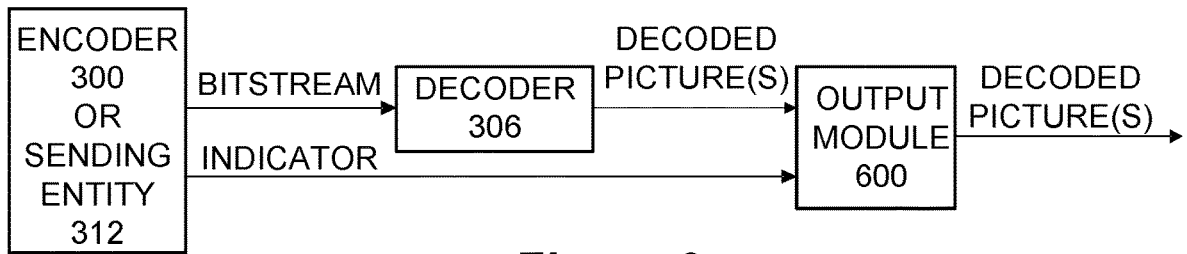
FIG. 6 is a block diagram illustrating an embodiment of suppressing output based on layer ID values according to some embodiments of inventive concepts.

FIG. 6 shows a conceptual system for the current embodiment. An encoder or sending entity produces a bitstream and an indicator. The indicator may or may not be embedded in the bitstream. A decoder decodes the bitstream into one or more decoded pictures. The output module 600 takes two inputs and has one output. The inputs are the indicator from the encoder 3 or sending entity 312 and a decoded picture from the decoder. 306 The output is either a decoded picture or no picture (i.e., no output).

The output module 600 uses indicator information from the indicator to decide whether the decoded picture output from the decoder 306 should be forwarded out from the output module 600 or not. Each decoded picture that is input to the output module 600 contains a layer ID value for each picture, and the output module 600 compares each layer ID value with layer ID value information derived from the indicator information and thereby determines whether or not to output each decoded picture as an output from the output module 600. Thus, in the case where one decoded picture is input to the output module 600, this decoded picture contains a layer ID value. This layer ID value is checked against the layer ID value information derived from the indicator information and the output module 600 decides from the outcome of this check whether or not to forward or output this one decoded picture.

Figure 7:
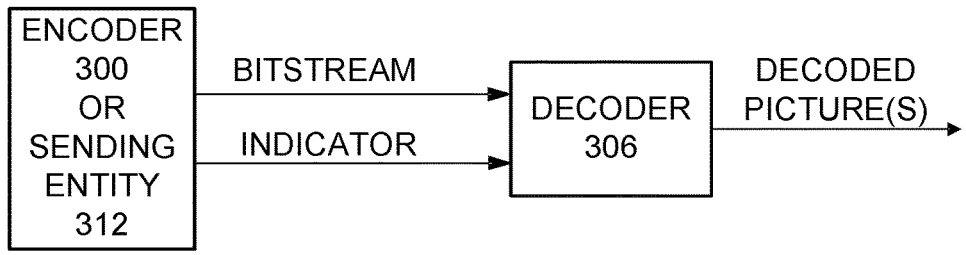
FIG. 7 is a block diagram illustrating an embodiment of suppressing output based on layer ID values according to some embodiments of inventive concepts.

In one embodiment as illustrated in FIG. 7, the output module 600 is merged with the decoder 306 such that the output module 600 is a sub-module of the decoder 306 and the decoder 306 takes both the bitstream and the indicator as input. In one version of this embodiment, the decoder does not even decode a picture based on the value of the indicator.

The indicator may carry information such that for a list or set of possible layer ID values, the information specifies whether or not a picture that has a certain layer ID value should be output from the output module or not. As an example, the indicator may carry the following information:

| Layer ID value | Output gating |
|---|---|
| 0 | No output |
| 1 | No output |
| 2 | Output |

In this example, a decoded picture having a Layer ID value equal to 0 or 1 is not output from the output module 600, but a decoded picture having a Layer ID value equal to 2 is output from the output module 600. It may be the case that there are other modules before or after the output mode 600 that additionally makes decisions whether to output the decoded picture or not. This means that not all decoded pictures out from the decoder 306 reaches the output module 600, since a picture may have been decided to not be forwarded by an earlier module. Likewise, even though the output module 600 decides to forward a decoded picture, the decoded picture may not be finally output or displayed to a user due to a later module taking a decision to not forward or output the decoded picture.

A decoder 306 or output module 600 may perform all or a subset of the following steps in this embodiment.
1. Obtaining an indicator I1 that specifies that the decoder or output module should not output pictures belonging to a layer T1
2. Obtaining a decoded picture P1 and obtaining a layer value for P1 that specifies that P1 belongs to the layer T1
3. Obtaining a decoded picture P2 and obtaining a layer value for P2 that specifies that P2 belongs to the layer T2 that is not the same layer as T1
4. In response to the indicator I1, suppress output of picture P1
5. Output picture P2

In one embodiment, the indicator I1 further comprises specifying that the decoder 306 should output pictures belonging to the layer T2.

In a version where the decoder performs the steps above (as illustrated in FIG. 7), step 1 additionally comprises the decoder obtaining the indicator I1 by decoding it from a bitstream. In yet another version, the indicator I1 is obtained from external means, such as from a sending entity.

In a version where the decoder 306 performs the steps above, step 2 additionally comprises the decoder decoding picture P1 from a coded picture in a bitstream to obtain the decoded picture P1. The decoder here also obtains the layer value for P1 from decoding the coded picture. Likewise, step 3 additionally comprises the decoder 306 decoding picture P2 from another coded picture in the bitstream to obtain the decoded picture P2. The decoder 306 also obtains the layer value for P2 from decoding the coded picture. The layer T1 may be a lower layer than T2 such that pictures in layer T2 depend on pictures in layer T1. In one version, the picture P2 uses picture P1 for prediction when it is decoded.

In one version, step 4 additionally comprises in response to the indicator I1, the decoder to not obtain or decode picture P1.

In another version of this embodiment, each of T1 and T2 comprises a set of layers (e.g., a plurality of layers).

Embodiment 2—Temporal Layers

In one embodiment of this embodiment, the layers T1 and T2 described above are temporal layers.

In this embodiment, a decoder or output module may perform all or a subset of the following steps:
1. Obtaining an indicator I1 that specifies that the decoder or output module should not output pictures belonging to temporal layer T1
2. Obtaining a decoded picture P1 and obtaining a temporal layer value for P1 that specifies that P1 belongs to the temporal layer T1
3. Obtaining a decoded picture P2 and obtaining a temporal layer value for P2 that specifies that P2 belongs to the temporal layer T2 that is not the same temporal layer as T1
4. In response to the indicator I1, suppress output of picture P1
5. Output picture P2

In another version of this embodiment, the layers T1 and T2 are temporal layers and the pictures P1 and P2 belong to the same scalability layer SL. In this version, there may be other indicators specifying that pictures belonging to scalability layer SL shall be output.

Embodiment 3—Temporal Layer and Scalability Layer

In this embodiment, the indicator I1 specifies that the decoder should not output pictures that belong to a temporal layer T1 and that belong to a scalability layer S1. This means that a picture must belong to both layers in order to not be output.

A decoder or output module may perform all or a subset of the following steps in this embodiment:
1. Obtaining an indicator I1 that specifies that the decoder or output module should not output pictures that belong to both temporal layer T1 and scalability layer S1
2. Obtaining a decoded picture P1 and obtaining a temporal layer value T1 for P1 and obtaining a scalability layer value S1 for P1
3. Obtaining a decoded picture P2 and obtaining a temporal layer value T2 for P2 and obtaining a scalability layer value S1 for P2, where T2 is not the same temporal layer as T1
4. In response to the indicator I1, suppress output of picture P1
5. Output picture P2

Embodiment 4—Using the Idea for Spatial Scalability

In this embodiment of inventive concepts, the picture P1 may be of a lower spatial resolution and picture P2 is of a higher spatial resolution than P1. For example, the resolution of P1 is 1920×1080 (full HD) and the resolution of P2 is 3840×2160 (4K). This means that spatial scalability is used.

Alternatively, the picture P1 may be of a lower fidelity than P2 and picture P2 may be of a higher fidelity than P1. This means that SNR scalability is used.

Picture P1 does belong to a lower layer than the layer that P2 belongs to such that picture P2 may depend on P1. In one version, the term "depend" means that the picture P2 uses picture P1 for prediction when P2 is decoded.

In this embodiment of inventive concepts, a bitstream may carry coded representations of P1 and P2. Extraction and output of the base layer (e.g. T1), which contains P1, may be done by pruning of temporal layers, e.g. by removing coded pictures not belonging to layer T1 from the bitstream. Output of the enhancement layer, which contains P2, may be done by providing an indicator I1 that specifies that the decoder should not output pictures that belong to temporal layer T1.

Figure 8:
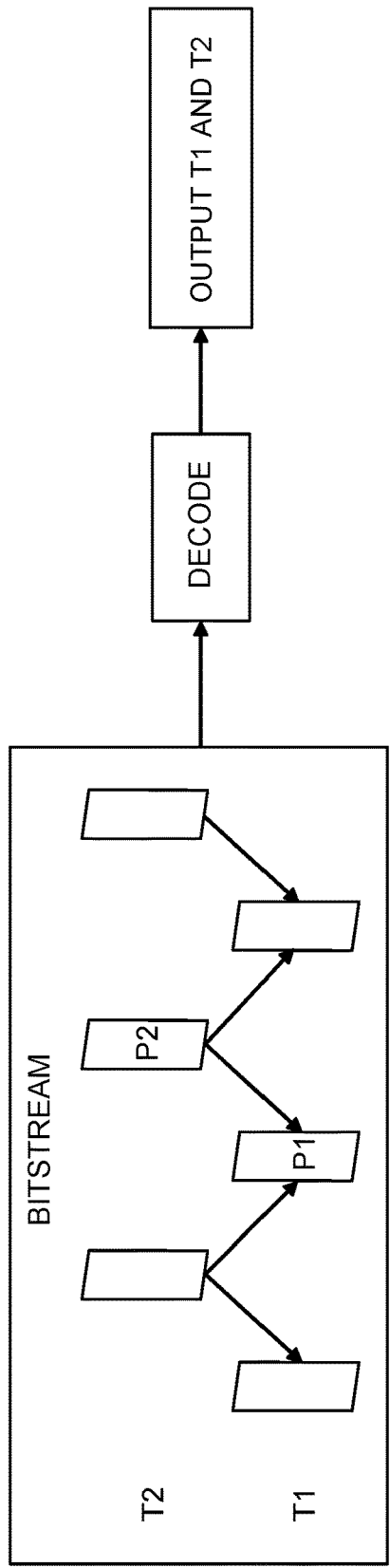
FIG. 8 is an illustration of a bitstream where all layers in the bitstream are output according to some embodiments of inventive concepts.
Figure 9:
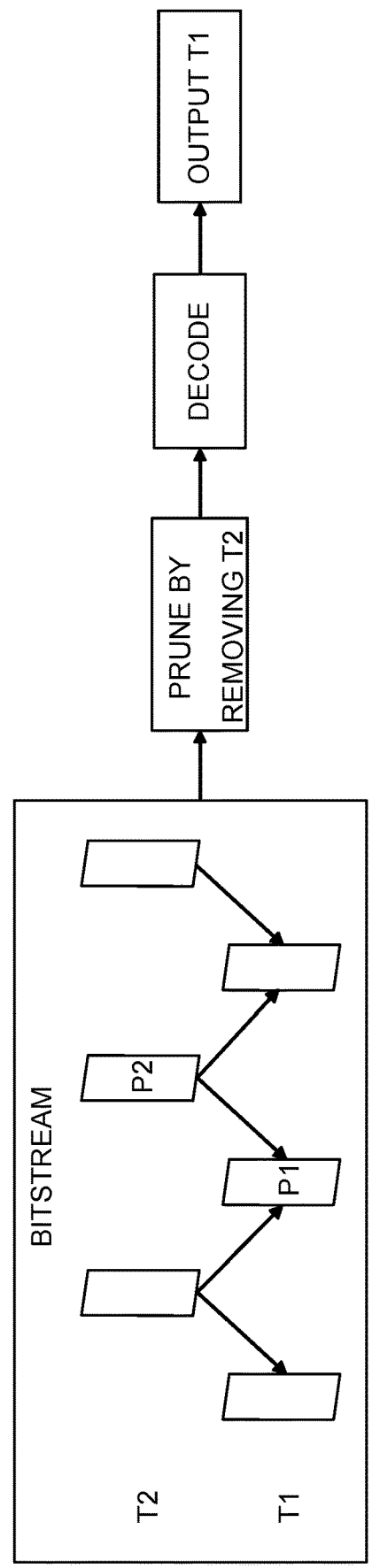
FIG. 9 is an illustration of a bitstream where a layer in the bitstream is pruned according to some embodiments of inventive concepts.
Figure 10:
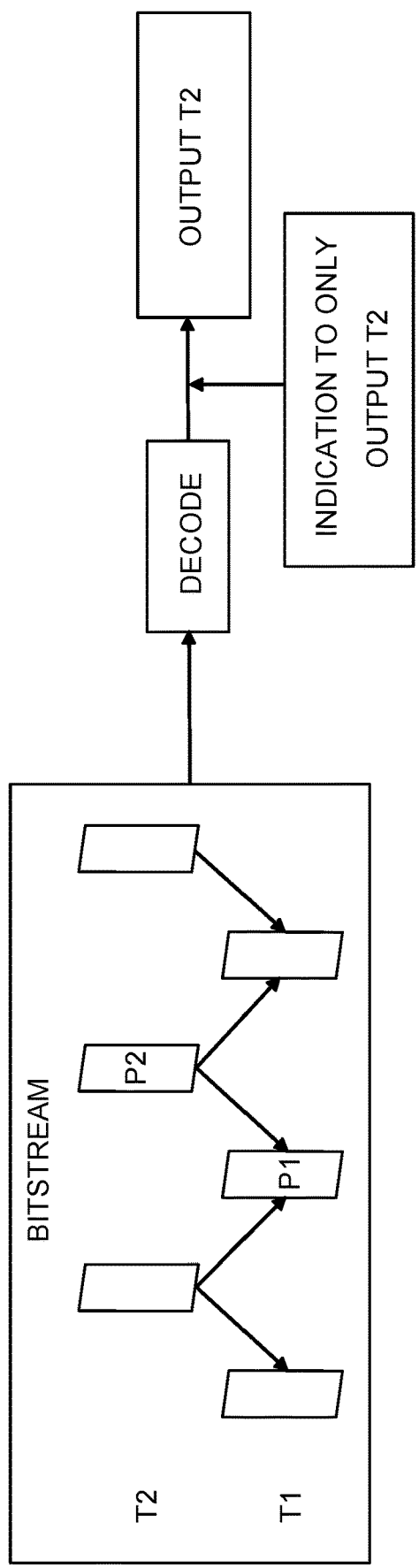
FIG. 10 is an illustration of a bitstream where layers in the bitstream are output based on an indication received according to some embodiments of inventive concepts.

The various embodiments of this embodiment is further illustrated in FIGS. 8-10. FIG. 8 illustrates the bitstream where all layers in the bitstream are output, which is the standard behavior when pruning is not performed. In FIG. 9, pruning of the bitstream is performed by removing layer T2 and only pictures from layer T1 are decoded and output. FIG. 10 is an example of the current embodiment where an indication is received by the output module to only output pictures in layer T2. Based on the indication, only pictures from layer T2 are output. Note that both layer T1 and T2 may be decoded in FIG. 10, since pictures of layer T2 may use pictures in layer T1 for prediction.

A server or a network node may perform the following steps in this embodiment:
1) Receiving an indication that a receiver should output the enhancement layer representation of a video content
2) In response to receiving the indication that a receiver should output the enhancement layer representation, the network node providing an indicator I1 to the receiver, where the indicator I1 specifies that the receiver should not output pictures belonging to a temporal layer T1

3) Providing a bitstream to the receiver, the bitstream containing at least one picture P1 belonging to a temporal layer T1 and at least one picture P2 belonging to a temporal layer T2

A decoder may perform all or a subset of the following steps for this embodiment:
1. Obtaining, from a bitstream, an indicator I1 that specifies that the decoder should not output pictures belonging to temporal layer T1
2. Decoding a picture P1 from the bitstream and obtaining, from the bitstream, a temporal layer value for P1 that specifies that P1 belongs to the temporal layer T1
3. Decoding a picture P2 from the bitstream and obtaining, from the bitstream, a temporal layer value for P2 that specifies that P2 belongs to the temporal layer T2 that is not the same temporal layer as T1, wherein the spatial resolution of P2 is higher than the spatial resolution of P1 and decoding the picture P2 comprises predicting sample values in P2 from sample values in P1 using reference picture resampling.
4. In response to the indicator I1, suppress output of picture P1
5. Output picture P2

Embodiment 5—Details of Indicator I1

In this embodiment, details of the indicator I1 for any of the previous embodiments are provided.

Syntax for the Indicator I1

In a preferred version, the indicator I1 may contain information of the number of layers the indicator I1 covers. As an example, the indicator I1 may cover 3 layers; layer 0, layer 1 and layer 2. Further, the indicator I1 may contain a value for each layer that I1 covers, where each value specifies whether pictures belonging to the corresponding layer should not be output from the decoder or should not be output from the output module. In the example above, the indicator contains 3 values, one for layer 0 specifying whether pictures belonging to layer 0 should not be output, one for layer 1 specifying whether pictures belonging to layer 1 should not be output and one for layer 2 specifying whether pictures belonging to layer 2 should not be output.

The indicator I1 may be present in coded format using syntax elements and the step 1 in embodiments 1, 2 and 3 above may be replaced by the following steps:
1a) Obtain a coded representation of an indicator I1, wherein the coded representation consists of a set of syntax elements.
1b) Decode N values from the set of syntax elements, where each value correspond to one layer, wherein one particular decoded value corresponding to a layer T1 specifies that the decoder or output module should not output pictures belonging to layer T1. The set of syntax elements may consist of N 1-bit syntax elements and each of the N values may be decoded from one 1-bit syntax elements.

Placement of the Indicator I1 in the Bitstream

In one version of inventive concepts, the coded representation of the indicator I1 is obtained from an SEI message.

In one version, the coded representation of the indicator I1 is obtained from a parameter set such as VPS, SPS, PPS or APS, or obtained from a DCI. In this case, picture P1 and picture P2 both refer to the parameter set or DCI.

In another version, the coded representation of the indicator I1 is obtained from an access unit delimiter NAL unit.

In a further version, the coded representation of the indicator I1 is obtained from a header such as a picture header or slice header.

The layers in this embodiment are preferably temporal layers.

Persistence of the Indicator I1

In one embodiment of inventive concepts, the indicator I1 is valid for one picture only, wherein the one picture is the picture that is associated with the indicator I1.

In another embodiment, the indicator I1 is valid for all pictures in one access unit, wherein the one access unit is the access unit that is associated with the indicator I1.

In another embodiment, the indicator I1 is valid for all pictures in the bitstream in decoding order until there is a new indicator in the bitstream.

In another embodiment, the indicator I1 is valid for all pictures in the bitstream in output order until there is a new indicator in the bitstream.

In another embodiment, the indicator I1 is valid for all pictures in the bitstream in decoding order until a new CVS or CLVS begins In another embodiment, the indicator I1 is valid for all pictures in the bitstream in output order until a new CVS or CLVS begins Embodiment 6—Further Details for an SEI Message Previously, it was mentioned that a coded representation of the indicator I1 may be obtained from an SEI message. This embodiment provides further details for this embodiment of inventive concepts.

A decoder or output module may perform all or a subset of the following steps in this embodiment:
1. Obtaining a coded representation of an indicator I1 from a NAL unit wherein the coded representation consists of a set of syntax elements, wherein the NAL unit belongs to a scalability layer SL.
2. Decoding N 1-bit values from the set of syntax elements, where each 1-bit value correspond to one temporal layer, wherein the decoded 1-bit value corresponding to a temporal layer T1 specifies that the decoder or output module should not output pictures belonging to temporal layer T1
3. Obtaining a decoded picture P1 and obtaining a temporal layer value T1 for P1 and obtaining a scalability layer value S1 for P1, wherein S1 is equal to SL.
4. Obtaining a decoded picture P2 and obtaining a temporal layer value T2 for P2 and obtaining a scalability layer value S2 for P2, wherein T2 is not the same temporal layer as T1 and wherein S2 is equal to SL.
5. Comparing the scalability layer value S1 with the scalability layer value SL
6. Evaluating the 1-bit value corresponding to temporal layer value T1
7. In response to scalability layer value S1 being equal to scalability value SL and the 1-bit value corresponding to temporal layer value T1 specifying that the decoder or output module should not output pictures belonging to temporal layer T1, suppressing the output of picture P1

8. Evaluating the 1-bit value corresponding to temporal layer value T2
9. In response to the scalability layer value S2 being equal to scalability value SL and the 1-bit value corresponding to temporal layer value T2 not specifying that the decoder or output module should not output pictures belonging to temporal layer T2, outputting picture P2

The NAL unit may be an SEI message NAL unit. Alternatively, the NAL unit may be an access unit NAL unit.

In one version of this embodiment, the information of indicator I1 is valid for one picture unit.

In a second version of this embodiment, the information of indicator I1 is valid for one access unit.

In a third version of this embodiment, the information of indicator I1 applies to the decoded picture associated with the NAL unit and persists for all subsequent pictures of the current layer in output order until one or more of the following three conditions are true:
1. A new CLVS of the current layer begins
2. The bitstream ends
3. A picture in the current layer in an AU associated with a NAL unit containing a new indicator is output that follows the decoded picture associated with the NAL unit in output order.

In a fourth version of this embodiment, the information of indicator I1 applies to the decoded picture associated with the NAL unit and persists for all subsequent pictures of the current layer in output order until one or more of the following three conditions are true:
1. A new CVS begins
2. The bitstream ends
3. A picture in the current layer in an AU associated with a NAL unit containing a new indicator is output that follows the decoded picture associated with the NAL unit in output order.

Specification text for this embodiment on top of JVET-R2001-v2 may look as follows:

Picture output suppression SEI message
Picture output suppression SEI message syntax

|  | Descriptor |
| --- | --- |
| picture_output_suppression( payloadSize ) {<br>  for( i = 0; i <= 6; i++ )<br>    pos_temporal_sublayer_no_output_flag[ i ] | u(1) |
|   pos_persistence_flag | u(1) |
| } |  |

Picture output suppression SEI message semantics
The picture output suppression SEI message may be used for identifying pictures that are recommended to not output or be displayed.

NOTE 1—For example, an encoder may use the picture output suppression SEI message to hint to a decoder that a single picture or a set of pictures may be discarded after output. Discarding pictures is optional and does not affect the decoding process specified in this Specification.

pos_temporal_sublayer_no_output_flag[i] equal to 1 specifies that pictures in the current layer with Temporand equal to i are not output. pos_temporal_sublayer_no_output_flag[i] equal to 0 specifies that pictures in the current layer with TemporalID equal to i may or may not be output. When not present, temporal_sublayer_no_output_flag[i] is inferred to be equal to 0.

pos_persistence_flag specifies the persistence of the picture output suppression SEI message for the current layer.

pos_persistence_flag equal to 0 specifies that the picture output suppression SEI message applies to the current decoded picture only.

pos_persistence_flag equal to 1 specifies that the picture output suppression SEI message applies to the current decoded picture and persists for all subsequent pictures of the current layer in output order until one or more of the following conditions are true:
A new CLVS of the current layer begins.
The bitstream ends.
A picture in the current layer in an AU associated with a picture output suppression SEI message is output that follows the current picture in output order.
NOTE 1—A previous persistant picture output suppression SEI message can be cancelled by a new SEI message where all pos_temporal_sublayer_no_output_flag[i] syntax elements are set equal to 0.

Embodiment 7—Further Details on the Indicator

In this embodiment, the indicator can be a single syntax element that specifies one layer ID value LID for which output should not be suppressed. In this embodiment, any picture with a layer ID value that is not equal to LID are indicated to not be output. In this embodiment, step 1 in embodiments 1, 2 and 3 above may be replaced by the following steps:
1a) Obtain a coded representation of an indicator I1, wherein the coded representation comprises a syntax element.
1b) Decode a layer ID value LID equal to T2 from the syntax element.
1c) Compare a value T1 with the LID value and determine that the decoder should not output pictures belonging to temporal layer T1 in response to the LID value not being equal to T1.

In an alternative embodiment, the indicator comprises a single syntax element that specifies one layer ID value LID such that a picture belonging to a layer lower than or equal to LID should be suppressed. In this embodiment, step 1 in embodiments 1, 2 and 3 above may be replaced by the following steps:
1a) Obtain a coded representation of an indicator I1, wherein the coded representation comprises a syntax element.
1b) Decode a layer ID value LID from the syntax element.
1c) Compare a value T1 with the LID value and determine that the decoder should not output pictures belonging to temporal layer T1 in response to the LID value being larger than T1.

In this alternative embodiment, the picture P2 belonging to T2 is output in response to determining that the LID value is lower than T2.

In yet another embodiment, the indicator comprises two syntax elements that specifies one lower layer ID value lowID and one higher layer ID value highID such that a picture belonging to a layer lower than lowID or higher than highID should be suppressed. In this embodiment, step 1 in embodiments 1, 2 and 3 above may be replaced by the following steps:
1a) Obtain a coded representation of an indicator I1, wherein the coded representation comprises two syntax elements.
1b) Decode a lower layer ID value lowID and a higher layer ID value highID from the two syntax elements.
1c) Compare a value T1 with the LID value and determine that the decoder should not output pictures belonging to temporal layer T1 in response to T1 being either lower than lowID or higher than highID.

In this alternative embodiment, the picture P2 belonging to T2 is output in response to determining that T2 is higher than or equal to lowID, and T2 is lower than or equal to highID.

Embodiment 8—Spatial Resolution

In this embodiment, an indicator I2 is received by the decoder that indicates that the spatial resolution in each temporal layer is constant. The indicator I2 may for instance be signaled in a DCI or a parameter set such as VPS, SPS or PPS or received by external means. The indicator I2 may be received by decoding a codeword, e.g. a flag, where a first value (e.g. 1) indicates that the spatial resolution in each temporal layer is constant, and a second value (e.g. 0) indicates that the spatial resolution in each temporal layer may not be constant.

In one version of this embodiment, the indicator I2 may indicate that all pictures belonging to a temporal layer uses the same PPS or different PPSes where all different PPSes have the same content. In this version, the spatial resolution is specified in the PPS which means that all pictures of a temporal layer have the same spatial resolution.

In one version of the embodiment, the indicator I2 is signaled with the same codeword as indicator I1 in embodiment 1 that specifies that the decoder or output module should not output pictures belonging to a layer T1. In another version of the embodiment, the indicator I2 is signaled in a separate codeword.

In one version of this embodiment RPR is used to predict between temporal layers of different spatial resolution. The indicator I2 may for instance be useful when a pictures of layer T1 has a first resolution, e.g. 1920×1080 (full HD) and the pictures of layer T2 has a second resolution 3840×2160 (4K), but the output from each layer is required to have a single resolution (e.g. mandated by a specification).

Embodiment 9—Decoder Process without Signaling Description

In this embodiment, spatial scalability encoding and decoding is done without scalability layers by assigning pictures that would be in different scalability layers to different temporal layers, wherein pictures of one temporal layer have the same spatial resolution and Inter prediction across temporal layers is done using RPR.

On the encoding side, there is a source video content. The content consists of pictures where each picture has a certain content time stamp value, which means that the picture is representing one specific time instance. The content time stamp value is not necessarily a real value but here used as a concept. The content consists of different spatial representations which means that there are multiple pictures having different spatial resolutions that all share the same content time stamp value.

Figure 11:
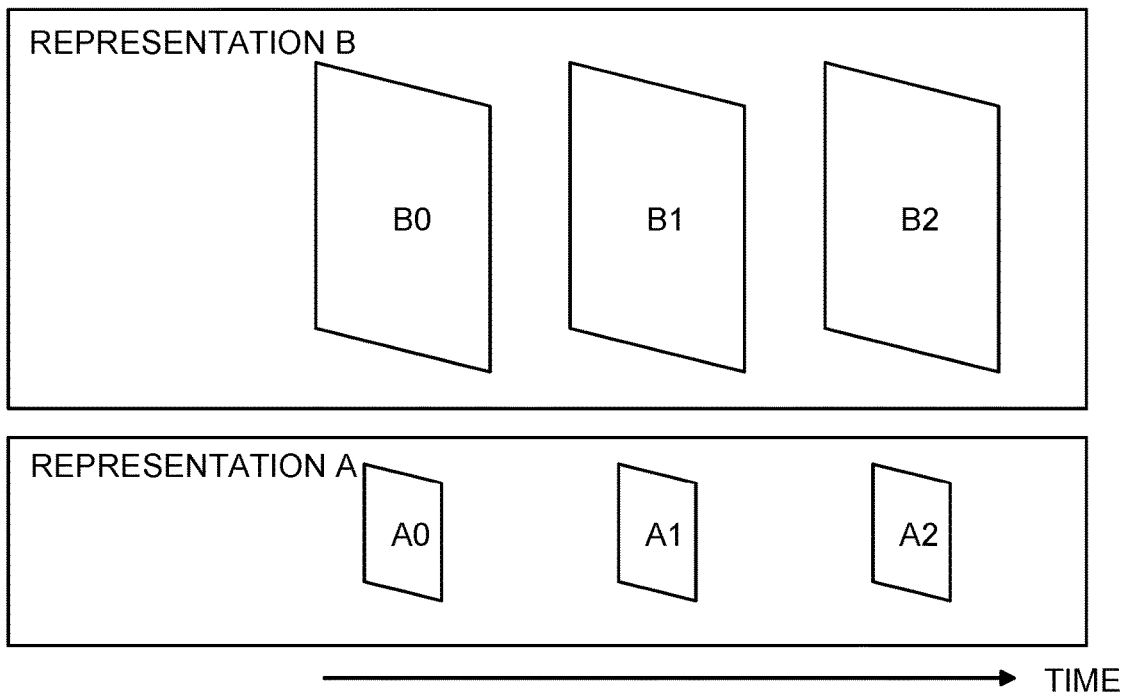
FIG. 11 is block diagram illustrating representations and content time stamps according to some embodiments of inventive concepts.

FIG. 11 illustrates an example of this embodiment with two spatial representations A and B. Representation A consists of three pictures of the same lower spatial resolution which is illustrated by the smaller rhombus. The content time stamps are 0, 1 and 2. Representation B consists of three pictures of the same larger spatial resolution with one picture for the same content time stamps 0, 1, and 2.

An encoder 300 may perform all or a subset of the following steps for this embodiment to encode at least two lower spatial resolution pictures A0 and A1 and two corresponding higher spatial resolution pictures B0 and B1 into a bitstream, wherein A0 and B0 share the same content time stamp and A1 and B1 share the same content time stamp:

1. Encode a picture A0 into the bitstream, wherein a temporal ID value equal to A and an output order or timestamp value equal to T0 is encoded into the bitstream for picture A0
2. Encode a picture B0 into the bitstream, wherein a temporal ID value equal to B and an output order or timestamp value equal to T1 is encoded into the bitstream for picture B0, wherein B represents a higher temporal layer than A, and wherein T1 represents a later output than T0, and wherein picture B0 uses picture A0 for Inter prediction.
3. Encode a picture A1 into the bitstream, wherein a temporal ID value equal to A and an output order or timestamp value equal to T2 is encoded into the bitstream for picture A1, wherein T2 represents a later output than T1 and wherein picture A1 uses picture A0 for Inter prediction
4. Encode a picture B1 into the bitstream, wherein a temporal ID value equal to B and an output order or timestamp value equal to T3 is encoded into the bitstream for picture B1, wherein T3 represents a later output than T2, and wherein picture B1 uses picture A1 and picture B0 for Inter prediction A decoder 306 may perform all or a subset of the following steps for this embodiment to decode at least two lower spatial resolution pictures A0 and A1 and two corresponding higher spatial resolution pictures B0 and B1 from a bitstream, wherein A0 and B0 share the same content time stamp and A1 and B1 share the same content time stamp:

1. Decode a picture A0 from the bitstream, wherein a temporal ID value equal to A and an output order or timestamp value equal to T0 are decoded from the bitstream for picture A0
2. Decode a picture B0 from the bitstream, wherein a temporal ID value equal to B and an output order or timestamp value equal to T1 are decoded from the bitstream for picture B0, wherein B represents a higher temporal layer than A, and wherein T1 represents a later output than T0, and wherein picture B0 uses picture A0 for Inter prediction
3. Decode a picture A1 from the bitstream, wherein a temporal ID value equal to A and an output order or timestamp value equal to T2 are decoded from the bitstream for picture A1, wherein T2 represents a later output than T1, and wherein picture A1 uses picture A0 for Inter prediction
4. Decode a picture B1 from the bitstream, wherein a temporal ID value equal to B and an output order or timestamp value equal to T3 are decoded from the bitstream for picture B1, wherein T3 represents a later output than T2, and wherein picture B1 uses picture A1 and picture B0 for Inter prediction
5. Output pictures B0 and B1 but do not output pictures A0 or A1

In some versions of this embodiment, a scalability layer value is additionally encoded into the bitstream or decoded from the bitstream for pictures A0, B0, A1, B1 wherein the scalability layer value for all four picture is the same value, meaning that all four pictures belong to the same scalability layer.

In some versions of this embodiment, the output order or timestamp values are picture order count, POC, values.

Operations of the decoder 306 (implemented using the structure of the block diagram of FIG. 4) will now be discussed with reference to the flow chart of FIG. 12 according to some embodiments of inventive concepts. For example, modules may be stored in memory 403 of FIG. 4, and these modules may provide instructions so that when the instructions of a module are executed by respective communication device processing circuitry 401, processing circuitry 401 performs respective operations of the flow charts.

Figure 12:
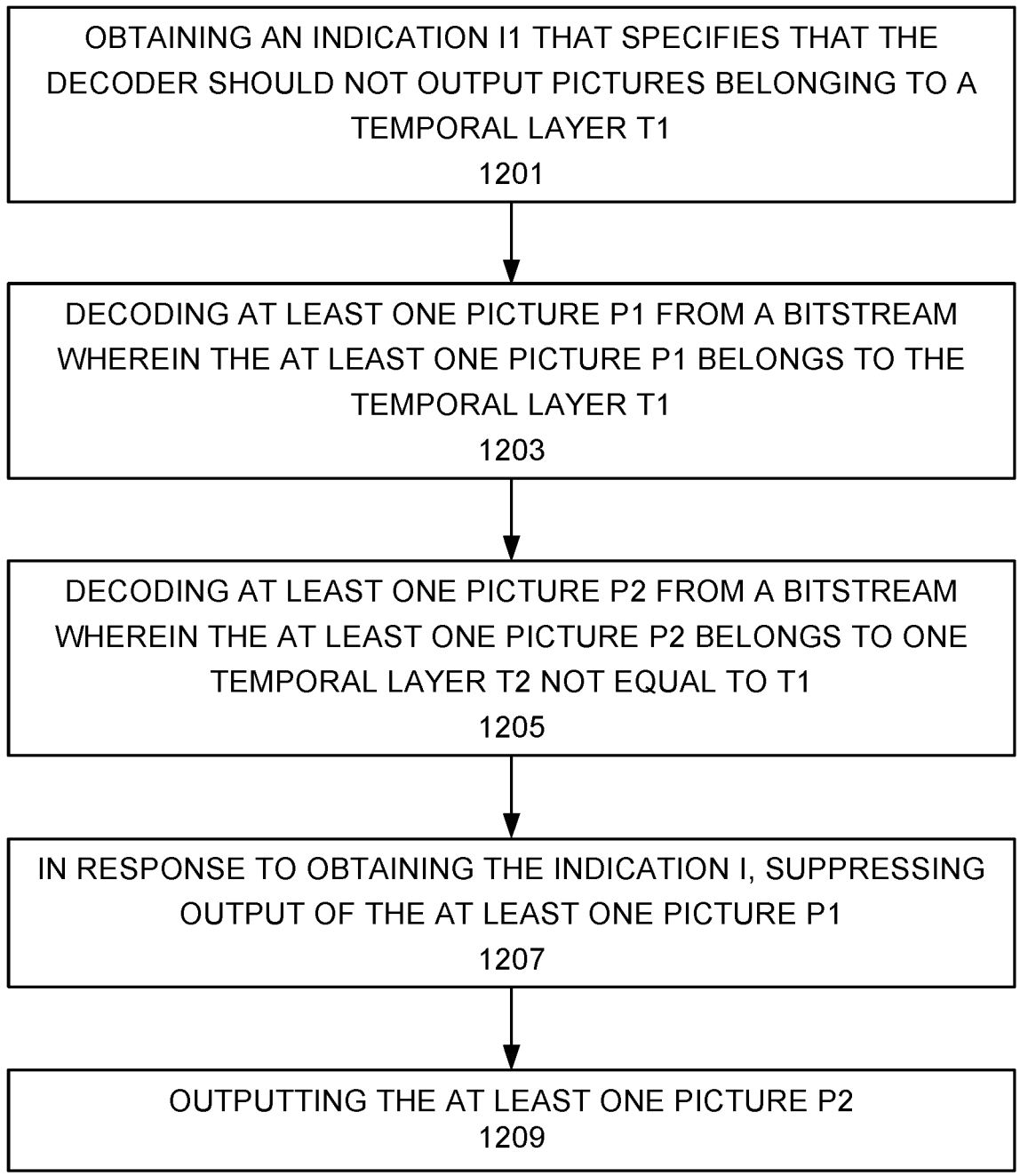
FIGS. 12-13 are flow charts illustrating operations of a decoder according to some embodiments of inventive concepts.

Turning to FIG. 12, in block 1201, the processing circuitry 401 obtains an indication I1 that specifies that the decoder 306 should not output pictures belonging to a layer T1.

In block 1203, the processing circuitry 401 decodes at least one picture P1 from a bitstream, wherein the at least one picture P1 belongs to a layer T1;

In block 1205, the processing circuitry 401, decodes at least one picture P2 from a bitstream, wherein the at least one picture P2 belongs to a layer T2;

In block 1207, the processing circuitry 401, responsive to obtaining the indication I1, suppresses output of the at least one picture P1;

In block 1209, the processing circuitry 401 outputs the at least one picture P2.

Figure 13:
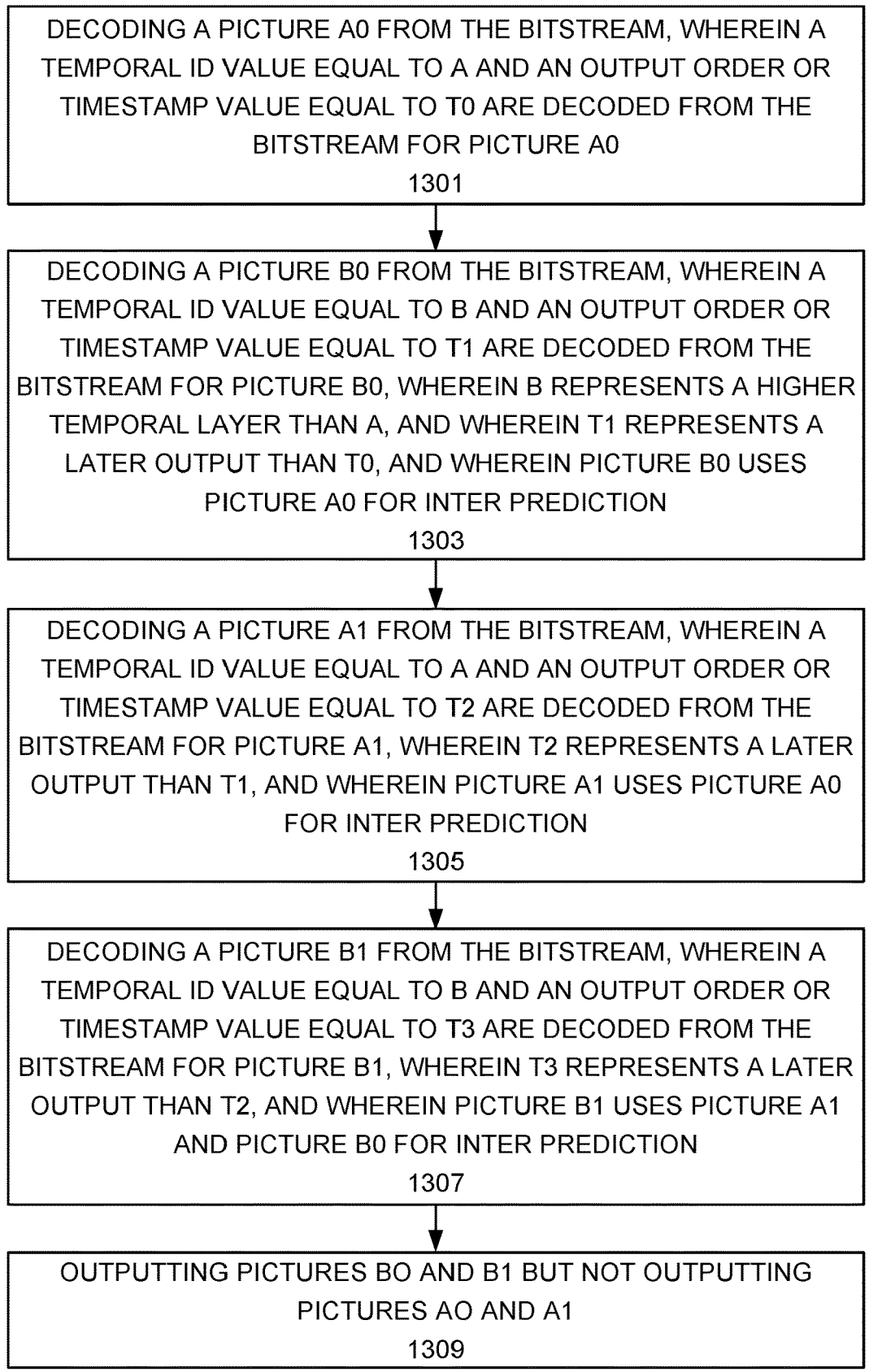

FIG. 13 illustrates operations of the decoder 306 in decoding at least two lower spatial resolution pictures A0 and A1 and two corresponding higher spatial resolution pictures B0 and B1 from a bitstream, where A0 and B0 share the same content time stamp and A1 and B1 share the same content time stamp.

Turning to FIG. 13, in block 1301, the processing circuitry 401 decodes a picture A0 from the bitstream, wherein a temporal ID value equal to A and an output order or timestamp value equal to T0 are decoded from the bitstream for picture A0.

In block 1303, the processing circuitry 401 decodes a picture B0 from the bitstream, wherein a temporal ID value equal to B and an output order or timestamp value equal to T1 are decoded from the bitstream for picture B0, wherein B represents a higher temporal layer than A, and wherein T1 represents a later output than T0, and wherein picture B0 uses picture A0 for Inter prediction.

In block 1305, the processing circuitry 401 decodes a picture A1 from the bitstream, wherein a temporal ID value equal to A and an output order or timestamp value equal to T2 are decoded from the bitstream for picture A1, wherein T2 represents a later output than T1, and wherein picture A1 uses picture A0 for Inter prediction.

In block 1307, the processing circuitry 401 decodes a picture B1 from the bitstream, wherein a temporal ID value equal to B and an output order or timestamp value equal to T3 are decoded from the bitstream for picture B1, wherein T3 represents a later output than T2, and wherein picture B1 uses picture A1 and picture B0 for Inter prediction In block 1309, the processing circuitry 401 outputs pictures B0 and B1, but does not output pictures A0 and A1.

Example embodiments are discussed below.

Embodiment 1. A method for decoding and output one or more pictures from a bitstream, the method comprising:
obtaining an indication I1 that specifies that the decoder should not output pictures belonging to a layer T1;
decoding at least one picture P1 from a bitstream wherein picture(s) P1 belong to the layer T1;
decoding at least one picture P2 from a bitstream wherein picture(s) P2 belong to one layer T2 not equal to T1;
responsive to receiving the indication I1, suppressing output of the at least one picture P1; and
outputting the at least one picture P2.

Embodiment 2: The method of Embodiment 1 wherein the indication I1 further specifies that the decoder should output pictures belonging to the layer T2

Embodiment 3: The method of any of Embodiments 1-2 wherein at least one of the layer T1 and the layer T2 is a temporal layer.

Embodiment 4: The method of Embodiment 3 wherein all of the at least one picture P1 and the at least one picture P2 belong to one single scalability layer.

Embodiment 5: The method of any of Embodiments 1-2 wherein at least one of the layer T1 and the layer T2 is a scalability layer Embodiment 6: The method of any of Embodiments 1-2 wherein the indication I1 specifies both a temporal layer T1 and a scalability layer S1 and wherein the at least one picture P1 belongs to temporal layer T1 and scalability layer S1.

Embodiment 7: The method of any of Embodiments 1-6 wherein the at least one picture P1 is of a lower spatial resolution and the at least one picture P2 is of a higher spatial resolution not equal to the resolution of the at least one picture P1.

Embodiment 8: The method of any of Embodiments 1-7 wherein decoding the indication I1 comprises decoding syntax elements to determine a number N layers and decode N flags wherein each flag specifies whether pictures belonging to the corresponding layer are output or not and wherein the flag corresponding to layer T1 specifies that pictures belonging to layer T1 should not be output and the flag corresponding to layer T2 specifies that pictures belonging to layer T2 should be output.

Embodiment 9: The method of any of Embodiments 1-8 where the indication I1 is at least in part decoded from an SEI message.

Embodiment 10: The method of any of Embodiments 1-8 where the indication I1 is at least in part decoded from an SPS.

Explanations are provided below for various abbreviations/acronyms used in the present disclosure.

| Abbreviation | Explanation |
| --- | --- |
| AU | Access Unit |
| AUD | Access Unit Delimiter |
| ALF | Adaptive Loop Filter |
| APS | Adaptive Parameter Set |
| BLA | Broken Link Access |
| CLVS | Coded Layer Video Sequence |
| CRA | Clean Random Access |
| CVS | Coded Video Stream |
| CVSS | CVS Start |
| DCI | Decoding Capability Information |
| DPS | Decoding Parameter Set |
| GDR | Gradual Decoding Refresh |
| HEVC | High-Efficiency Video Coding |
| IDR | Instantaneous Decoding Refresh |
| IRAP | Intra Random Access Point |
| LMCS | Luma Mapping and Chroma Scaling |
| MPEG | Motion Picture Experts Group |
| NAL | Network Abstraction Layer |
| NALU | NAL unit |
| NUT | NAL unit type |
| PPS | Picture Parameter Set |
| RADL | Random Access Decodable Leading |
| RAP | Random Access Point |
| RASL | Random Access Skipped Leading |
| RBSP | Raw Byte Sequence Payload |
| SEI | Supplemental Enhancement layer |
| SPS | Sequence Parameter Set |
| STSA | Step-wise Temporal Layer Access |

| Abbreviation | Explanation |
|---|---|
| VCL | Video Coding Layer |
| VPS | Video Parameter Set |
| VVC | Versatile Video Coding |

References are identified below.
1. JVET-S0152-v5, Versatile Video Coding, Joint Video Experts Team Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for decoding and outputting one or more pictures from a bitstream, each of the one or more pictures being associated with a temporal layer indicated by a value of a respective temporal layer identifier associated with the picture, the method comprising:
   obtaining an indication I1 that specifies that the decoder should not output pictures belonging to a temporal layer with identifier value T1;
   decoding at least one picture P1 from a bitstream wherein picture(s) P1 belong to the temporal layer T1;
   decoding at least one picture P2 from a bitstream wherein picture(s) P2 belong to one temporal layer with identifier value T2 not equal to T1;
   responsive to receiving the indication I1, suppressing output of the at least one picture P1; and
   outputting the at least one picture P2.

2. The method of claim 1 wherein the indication I1 further specifies that the decoder should output pictures belonging to the temporal layer T2.

3. The method of claim 1, wherein all of the at least one picture P1 and the at least one picture P2 belong to one single scalability layer.

4. The method of claim 1, wherein the indication I1 specifies both a temporal layer T1 and a scalability layer S1 and wherein the at least one picture P1 belongs to temporal layer T1 and scalability layer S1.

5. The method of claim 1, wherein the at least one picture P1 is of a lower spatial resolution and the at least one picture P2 is of a higher spatial resolution not equal to the resolution of the at least one picture P1.

6. The method of claim 1, wherein decoding the indication I1 comprises decoding syntax elements to determine a number N temporal layers and decode N flags wherein each flag specifies whether pictures belonging to the corresponding temporal layer are output or not and wherein the flag corresponding to temporal layer T1 specifies that pictures belonging to temporal layer T1 should not be output and the flag corresponding to temporal layer T2 specifies that pictures belonging to temporal layer T2 should be output.

7. The method of claim 1, where the indication I1 is at least in part decoded from a supplemental enhancement information, SEI, message.

8. The method of claim 1, where the indication I1 is at least in part decoded from one or more of a video parameter set, VPS, sequence parameter set, SPS, picture parameter set, PPS, adaptation parameter set, APS, decoding capability information, DCI, picture header or slice header.

9. A method for decoding at least two lower spatial resolution pictures A0 and A1 and two corresponding higher spatial resolution pictures B0 and B1 from a bitstream, wherein A0 and B0 share the same content time stamp and A1 and B1 share the same content time stamp, the method comprising:
   decoding a picture A0 from the bitstream, wherein a temporal ID value equal to A and an output order or timestamp value equal to T0 are decoded from the bitstream for picture A0;
   decoding a picture B0 from the bitstream, wherein a temporal ID value equal to B and an output order or timestamp value equal to T1 are decoded from the bitstream for picture B0, wherein B represents a higher temporal layer than A, and wherein T1 represents a later output than T0, and wherein picture B0 uses picture A0 for Inter prediction;
   decoding a picture A1 from the bitstream, wherein a temporal ID value equal to A and an output order or timestamp value equal to T2 are decoded from the bitstream for picture A1, wherein T2 represents a later output than T1, and wherein picture A1 uses picture A0 for Inter prediction;
   decoding a picture B1 from the bitstream, wherein a temporal ID value equal to B and an output order or timestamp value equal to T3 are decoded from the bitstream for picture B1, wherein T3 represents a later output than T2, and wherein picture B1 uses picture A1 and picture B0 for Inter prediction; and
   outputting pictures B0 and B1 but not outputting pictures A0 or A1.

10. The method of claim 9 further comprising:
    decoding scalability layer values from the bitstream for pictures A0, B0, A1, B1 wherein the scalability layer value for all four pictures is the same value.

11. An apparatus comprising:
    processing circuitry; and
    memory coupled with the processing circuitry, wherein the memory includes instructions that when executed by the processing circuitry causes the apparatus to:
    obtain an indication I1 that specifies that the decoder should not output pictures belonging to a temporal layer T1;
    decode at least one picture P1 from a bitstream wherein picture(s) P1 belong to the temporal layer T1;
    decode at least one picture P2 from a bitstream wherein picture(s) P2 belong to one temporal layer T2 not equal to T1;
    responsive to receiving the indication I1, suppress output of the at least one picture P1; and
    output the at least one picture P2.

12. The apparatus of claim 11 wherein the indication I1 further specifies that the decoder should output pictures belonging to the temporal layer T2.

13. The apparatus of claim 11, wherein all of the at least one picture P1 and the at least one picture P2 belong to one single scalability layer.

14. The apparatus of claim 11, wherein the indication I1 specifies both a temporal layer T1 and a scalability layer S1 and wherein the at least one picture P1 belongs to temporal layer T1 and scalability layer S1.

15. The apparatus of claim 11, wherein to decode the indication I1, the memory includes instructions that when executed by the processing circuitry causes the apparatus to:

decode syntax elements to determine a number N temporal layers and decode N flags wherein each flag specifies whether pictures belonging to the corresponding temporal layer are output or not and wherein the flag corresponding to temporal layer T1 specifies that pictures belonging to temporal layer T1 should not be output and the flag corresponding to temporal layer T2 specifies that pictures belonging to temporal layer T2 should be output.

16. The apparatus of claim 11, wherein to obtain the indication I1, the memory includes instructions that when executed by the processing circuitry causes the apparatus to decode the indication I1 at least in part from a supplemental enhancement information, SEI, message.

17. The apparatus of claim 11, wherein to obtain the indication I1, the memory includes instructions that when executed by the processing circuitry causes the apparatus to decode the indication I1 at least in part from one or more of a video parameter set, VPS, sequence parameter set, SPS, picture parameter set, PPS, adaptation parameter set, APS, decoding capability information, DCI, picture header or slice header.

18. An apparatus comprising:

processing circuitry; and memory coupled with the processing circuitry, wherein the memory includes instructions that when executed by the processing circuitry causes the apparatus to:

decode a picture A0 from the bitstream, wherein a temporal ID value equal to A and an output order or timestamp value equal to T0 are decoded from the bitstream for picture A0;

decode a picture B0 from the bitstream, wherein a temporal ID value equal to B and an output order or timestamp value equal to T1 are decoded from the bitstream for picture B0, wherein B represents a higher temporal layer than A, and wherein T1 represents a later output than T0, and wherein picture B0 uses picture A0 for Inter prediction;

decode a picture A1 from the bitstream, wherein a temporal ID value equal to A and an output order or timestamp value equal to T2 are decoded from the bitstream for picture A1, wherein T2 represents a later output than T1, and wherein picture A1 uses picture A0 for Inter prediction;

decode a picture B1 from the bitstream, wherein a temporal ID value equal to B and an output order or timestamp value equal to T3 are decoded from the bitstream for picture B1, wherein T3 represents a later output than T2, and wherein picture B1 uses picture A1 and picture B0 for Inter prediction; and output pictures B0 and B1 but not output pictures A0 or A1.

19. The apparatus of claim 18, wherein the memory includes further instructions that when executed by the processing circuitry causes the apparatus to:

decode scalability layer values from the bitstream for pictures A0, B0, A1, B1 wherein the scalability layer value for all four pictures is the same value.

20. A computer program product comprising a non-transitory storage medium including program code to be executed by processing circuitry of a communication device, whereby execution of the program code causes the communication device to perform operations according to claim 1.

* * * * *